US011660633B2

(12) United States Patent
Gray et al.

(10) Patent No.: US 11,660,633 B2
(45) Date of Patent: May 30, 2023

(54) SPREADER FOR PARTICULATE MATERIAL WITH IMPROVED SPREAD CONTROL

(71) Applicant: Salford Group Inc., Salford (CA)

(72) Inventors: Geof J. Gray, Burford (CA); John Mark Averink, Norwich (CA); Bradley William Baker, Stratford (CA); Jesse Abram Dyck, London (CA); Joshua Scott Fields, Clermont, GA (US); Steven Ray Owenby, Blairsville, GA (US)

(73) Assignee: Salford Group Inc., Salford (CA)

( * ) Notice: Subject to any disclaimer, the term of this patent is extended or adjusted under 35 U.S.C. 154(b) by 0 days.

(21) Appl. No.: 17/519,125

(22) Filed: Nov. 4, 2021

(65) Prior Publication Data

US 2022/0055064 A1 Feb. 24, 2022

Related U.S. Application Data

(62) Division of application No. 16/770,140, filed as application No. PCT/CA2018/051562 on Dec. 6, 2018, now Pat. No. 11,198,149.

(Continued)

(51) Int. Cl.
*B05C 19/00* (2006.01)
*B05C 19/06* (2006.01)
(Continued)

(52) U.S. Cl.
CPC ............ *B05C 19/008* (2013.01); *B05C 19/06* (2013.01); *B05D 1/28* (2013.01); *A01C 15/006* (2013.01);
(Continued)

(58) Field of Classification Search
None
See application file for complete search history.

(56) References Cited

U.S. PATENT DOCUMENTS 3,889,883 A 6/1975 Anderson
3,966,592 A * 6/1976 Herbert .................... B03B 5/50 209/462

(Continued)

FOREIGN PATENT DOCUMENTS

CN 106717403 A 5/2017
CN 107404837 A 11/2017

(Continued)

OTHER PUBLICATIONS

Office action dated Jan. 17, 2022 on Chinese application 201880088750.5.

(Continued)

*Primary Examiner* — Jethro M. Pence
(74) *Attorney, Agent, or Firm* — Brunet & Co. Ltd.; Robert Brunet; Hans Koenig

(57) ABSTRACT

A method of controlling spread pattern of a particulate material broadcasted by a spinner spreader involves permitting particulate material to flow through a plurality of sluices situated in a particulate material path between a bin and a rotatable disc of a spinner spreader. Each sluice receives a portion of the particulate material and delivers the portion of particulate material to a radial and/or angular position on the rotatable disc. The radial and/or angular position on the rotatable disc to which the portion of particulate material from at least one of sluices is delivered is adjusted by longitudinally translating the at least one independently moveable sluice independent of all other sluices of the plurality of sluices to change position of the at least one independently moveable sluice relative to the rotating disc (Continued)

thereby changing the spread pattern of the particulate material broadcasted by the rotatable disc.

10 Claims, 12 Drawing Sheets

Related U.S. Application Data

(60) Provisional application No. 62/595,844, filed on Dec. 7, 2017.

(51) Int. Cl.

| | |
|---|---|
| ***B05D 1/28*** | (2006.01) |
| *A01C 15/00* | (2006.01) |
| *A01C 15/12* | (2006.01) |
| *A01C 19/02* | (2006.01) |
| *E01C 19/20* | (2006.01) |

(52) U.S. Cl.

CPC ............ *A01C 15/122* (2013.01); *A01C 19/02* (2013.01); *E01C 19/203* (2013.01); *E01C 2019/2075* (2013.01)

(56) References Cited

U.S. PATENT DOCUMENTS 4,003,258 A * 1/1977 Suzuki ................ G01F 23/0007 73/290 R
4,274,786 A * 6/1981 Svensson ................. D21B 1/06 414/218
4,561,595 A 12/1985 Van Der Lily
4,831,959 A * 5/1989 Turner ................ B05B 13/0257 427/221
6,079,643 A 6/2000 Hoyle
6,209,808 B1 4/2001 Anderson
7,925,188 B2 * 4/2011 Senoh ................ G03G 15/0893 399/61
8,777,707 B2 7/2014 Hoyle
2002/0100401 A1 * 8/2002 Lempriere ............. A01C 7/125 111/178
2009/0232980 A1 * 9/2009 Schaefer ............. B05B 12/1463 118/308
2012/0141657 A1 * 6/2012 Aschenbeck ........... B05C 19/04 118/308
2012/0164322 A1 * 6/2012 Teulet ...................... B05D 7/52 118/103
2012/0174841 A1 * 7/2012 Friggstad ............... A01C 7/088 111/178
2014/0116626 A1 * 5/2014 Maruhata .......... A61F 13/15764 156/543
2014/0117122 A1 * 5/2014 Pare ...................... E01C 19/203 239/668
2014/0124143 A1 * 5/2014 Maruhata .......... A61F 13/15764 156/383
2014/0138031 A1 * 5/2014 Maruhata .............. B05C 1/0808 156/390
2014/0144586 A1 * 5/2014 Maruhata ................ B05C 19/06 118/308
2014/0144587 A1 * 5/2014 Maruhata .......... A61F 13/15577 118/244
2014/0270994 A1 * 9/2014 Gualtieri ................. B05C 19/06 406/82
2015/0044365 A1 * 2/2015 Svec ....................... B05C 19/06 118/308
2015/0072073 A1 * 3/2015 Svec ....................... B05C 19/06 427/188
2015/0072074 A1 * 3/2015 Mishler ................. B05C 19/008 427/188
2016/0001319 A1 * 1/2016 Svec ........................ B05D 1/30 118/308
2016/0120116 A1 * 5/2016 Bastin .................. A01C 17/008 700/241
2016/0199873 A1 * 7/2016 Maruhata ................ A61F 13/15 118/308
2017/0086355 A1 * 3/2017 Borkgren ............... A01C 7/084
2017/0113243 A1 * 4/2017 Koschitzky ............. B05C 19/04
2017/0273236 A1 9/2017 Owenby
2017/0274397 A1 9/2017 Podoll et al.
2017/0307430 A1 * 10/2017 Sibling ................... G01F 15/14
2018/0085897 A1 * 3/2018 Nienaber ............. B24D 11/005
2018/0255700 A1 * 9/2018 Cloutier Boily ....... A01C 7/127
2018/0255701 A1 * 9/2018 Cloutier Boily ....... A01C 7/127
2018/0255702 A1 * 9/2018 Cloutier Boily ....... A01C 7/127
2018/0311629 A1 * 11/2018 Cornelius ................ A23G 3/26
2018/0345541 A1 * 12/2018 Cuyt ....................... B22F 10/20
2019/0001369 A1 * 1/2019 Brutinel .................. B05C 9/025
2019/0050002 A1 * 2/2019 Engel ....................... A01C 7/12
2019/0127928 A1 * 5/2019 Liu ..................... E01C 19/4873
2020/0038905 A1 * 2/2020 Yasuhara ................. B05D 3/00
2020/0107489 A1 * 4/2020 Hiedeman .............. A01B 59/06
2020/0164401 A1 * 5/2020 Dobbs ..................... B05C 19/04
2020/0375240 A1 * 12/2020 Meulendijks ........... A23P 20/12

FOREIGN PATENT DOCUMENTS

DE 19856926 A1 6/1999
EP 0489674 A1 6/1992
EP 0653908 B1 12/1996
EP 1504645 A1 2/2005
EP 2409559 A1 1/2012
FR 2772550 A1 6/1999
GB 1130573 A 10/1968

OTHER PUBLICATIONS

Extended European Search Report dated Oct. 15, 2021 on EP 18886329.4.
International Search Report and Written Opinion dated Jan. 29, 2019 on PCT/CA2018/051562.
Office Action dated Jun. 18, 2021 on U.S. Appl. No. 16/770,140.

* cited by examiner

SPREADER FOR PARTICULATE MATERIAL WITH IMPROVED SPREAD CONTROL

CROSS-REFERENCE TO RELATED APPLICATIONS

This application is a divisional application of U.S. patent application Ser. No. 16/770,140 filed Jun. 5, 2020, which is a national entry of International application PCT/CA2018/051562 filed Dec. 6, 2018, which claims the benefit of U.S. Provisional Patent Application Ser. No. 62/595,844 filed Dec. 7, 2017, the entire contents of all of which are herein incorporated by reference.

FIELD

This application relates to apparatuses for spreading particulate material.

BACKGROUND

Spinner spreaders are known in the art for broadcasting particulate material to a ground surface (e.g. an agricultural field, a road, and the like) for a variety of applications, for example, spreading fertilizer, fertilizer supplements, seed, sand, gravel, road salt, lime and the like. Spread pattern of the particulate material is dependent on spinner design, including size, placement and orientation of fins on a spinner disc, and on rotational speed of the disc. Distance to which particulate material is ejected may be controlled by the spinner design and the rotational speed of the disc, but uniformity of the spread pattern may be unduly affected when the disc speed is changed, especially when the rotational speed is reduced below a certain rate. However, for some applications, it is desirable to be able to reduce the disc speed while maintaining a uniform spread pattern. In other applications, it is desirable to be able to manipulate the spread pattern to provide a desired pattern.

Therefore, there remains a need in the art for a spinner spreader that provides greater control over spread pattern.

SUMMARY

There is provided an apparatus for spreading particulate material, the apparatus comprising: a bin for holding particulate material; a rotatable disc for broadcasting the particulate material to a ground surface; a conveyor for conveying the particulate material in a particulate material path from the hopper to the rotatable disc; and, a plurality of sluices situated in the particulate material path between the bin and the rotatable disc, each sluice receiving a portion of the particulate material and delivering the portion of particulate material to a radial and/or angular position on the rotatable disc, at least one of the sluices independently moveable to adjust the radial and/or angular position on the rotatable disc to which the portion of particulate material from the at least one independently moveable sluice is delivered, each sluice comprising substantially vertically oriented side walls, an open first end for receiving the particulate material from the conveyor, an inclined floor inclined downwardly from the first end to an open second end of the sluice so that the particulate material in the sluice flows freely out the open second end.

A method of controlling spread pattern of a particulate material broadcasted by a spinner spreader, the method comprising: permitting particulate material to flow through a plurality of sluices situated in a particulate material path between a bin and a rotatable disc of a spinner spreader, each sluice receiving a portion of the particulate material and delivering the portion of particulate material to a radial and/or angular position on the rotatable disc, each sluice comprising substantially vertically oriented side walls, an open first end for receiving the particulate material from the conveyor, an inclined floor inclined downwardly from the first end to an open second end of the sluice so that the particulate material in the sluice flows freely out the open second end; and, adjusting the radial and/or angular position on the rotatable disc to which the portion of particulate material from at least one of sluices is delivered by moving the at least one of the sluices relative to the rotating disc thereby changing the spread pattern of the particulate material broadcasted by the rotatable disc.

In an embodiment, each of the plurality of sluices is independently moveable to adjust the radial and/or angular positions on the rotatable disc to which the portions of particulate material from the independently moveable sluices are delivered. In an embodiment, the plurality of sluices comprises at least four sluices. Each of the sluices may be moveable longitudinally, transversely, vertically, rotationally or any combination thereof. Each sluice may be independently moveable in at least one of a longitudinal, transverse, vertical or rotational direction. Each sluice may be independently moveable in two, three or all four of the longitudinal, transverse, vertical and rotational directions. In some embodiments, the sluices may be collectively moveable in at least one of the longitudinal, transverse, vertical and rotational directions. The sluices may be collectively moveable in two, three or all four of the longitudinal, transverse, vertical and rotational directions. The ability to move the sluices in a number of different directions permits fine tuning of the spread pattern of the particulate material.

In an embodiment, each sluice comprises substantially vertically oriented side walls, an open top for receiving the particulate material from the conveyor, an inclined floor inclined downwardly from a first end to an open second end of the sluice so that the particulate material in the sluice flows freely out the open second end. In an embodiment, the sluices are disposed transversely to one another to form a series of parallel channels. In one embodiment, adjacent sluices of the series of parallel channels abut each other at the substantially vertically oriented side walls. In one embodiment, the sluices do not share common side walls.

The sluices are moveable using any suitable mechanism. For example, the sluices may be moveable manually, using one or more crank adjusters, using one or more linear actuators, using one or more hydraulic cylinders, using one or more pneumatic cylinders, or some combination thereof. Each sluice may be moveable by its own dedicated mechanism or mechanisms, or may be moveable by a mechanism or mechanisms common to more than one sluice. In an embodiment, the plurality of sluices comprises an elongated securing element that passes through aligned elongated slots in the side walls so that each of the sluices rests on the elongated securing element, each of the sluices independently translatable on the elongated securing element when not secured by the securing element and not translatable when secured by the securing element. In an embodiment, the elongated securing element comprises a threaded rod and one or more nuts, wherein tightening the one or more nuts on the rod immobilizes the sluices and loosening the one or more nuts on the rod permits the sluices to translate on the rod.

In an embodiment, the rotatable disc comprises first and second rotatable discs, and the plurality of sluices comprises first and second sets of sluices, the first set of sluices delivering the particulate material to the first rotatable disc and the second set of sluices delivering the particulate material to the second rotatable disc.

Deliberate control of the radial and/or angular position to which the particulate material is delivered to the rotatable disc and the speed at which the particulate material is delivered to the rotatable disc may be used to develop custom spread patterns for the particulate material. The rotational speed of the rotatable disc controls rotational positions at which the particulate material is broadcasted from the rotatable disc. The speed at which the particulate material is delivered to the rotatable disc controls the amount of particulate material delivered from the rotatable discs in a given time period. Manipulating these variables permits fine tuning the spread pattern of particulate material. Additionally, accuracy of the spread pattern may be further adjusted by altering the size and/or shape of the open rear ends of the sluices. For example, narrower sluices may reduce the likelihood of the particulate material shattering when delivered to the rotatable disc by localizing the particulate material more toward the center of the disc where rotational speed of the disc is lower.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
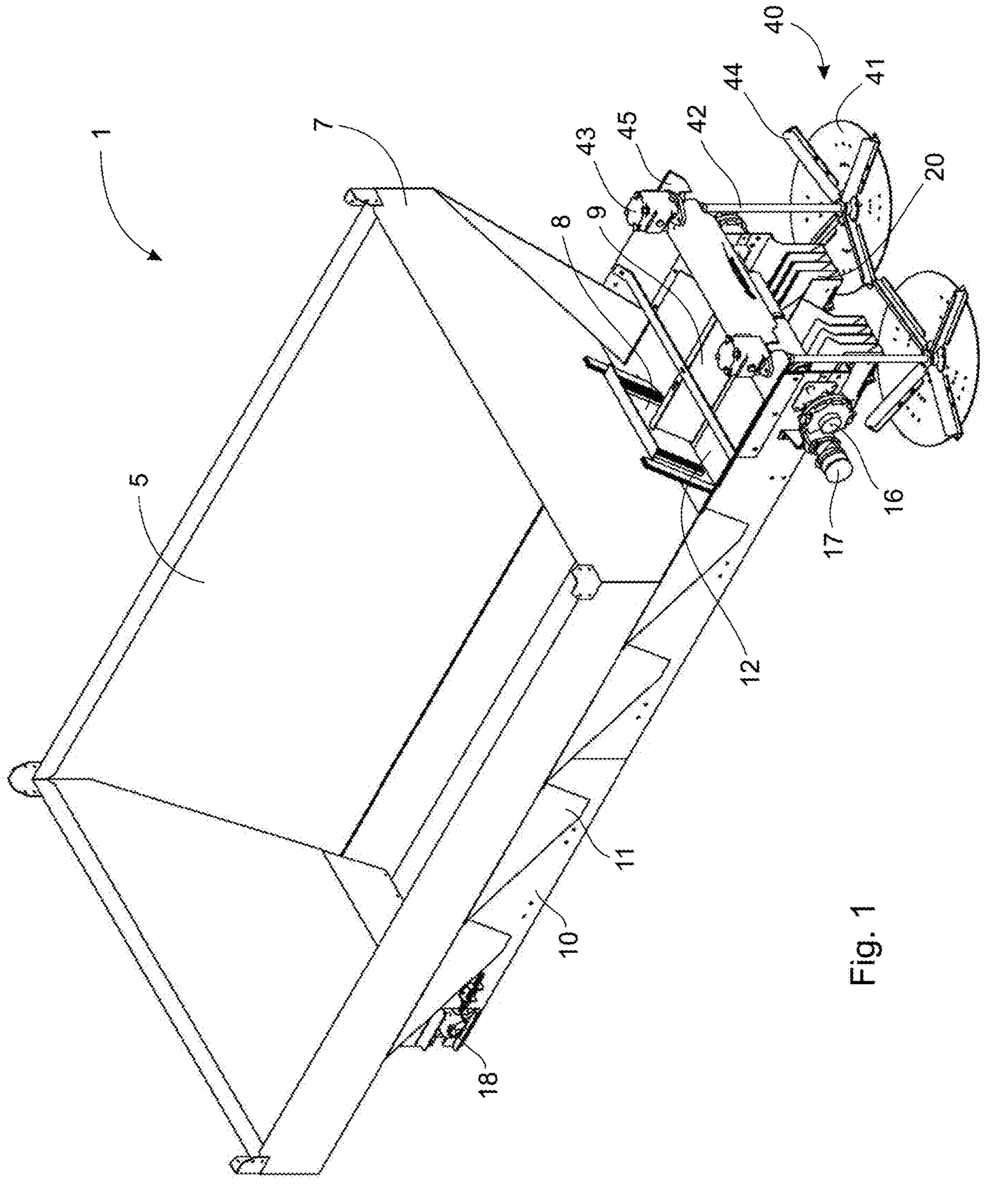
FIG. 1 depicts a rear perspective view of one embodiment of a spinner spreader.
Figure 2:
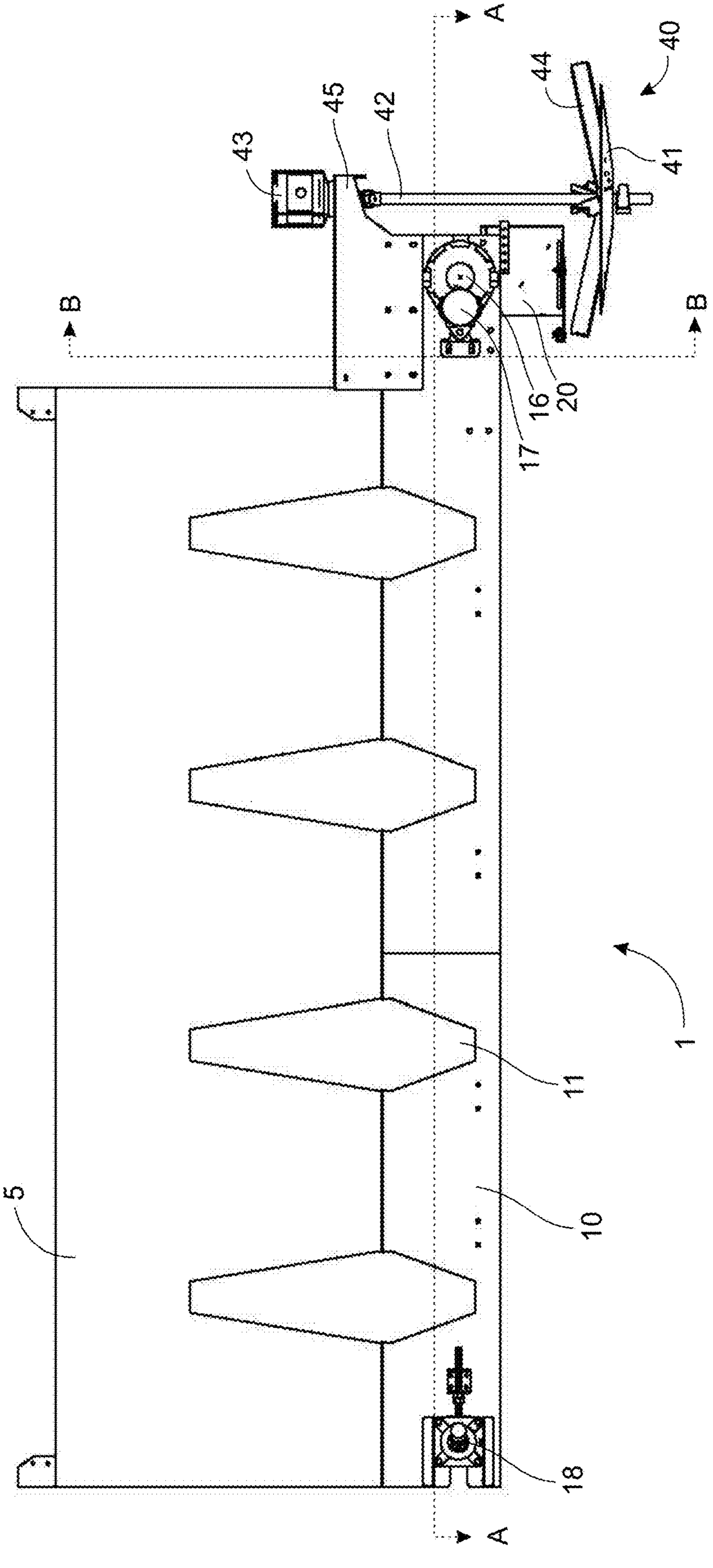
FIG. 2 depicts a side view of the spinner spreader of FIG. 1.
Figure 3:
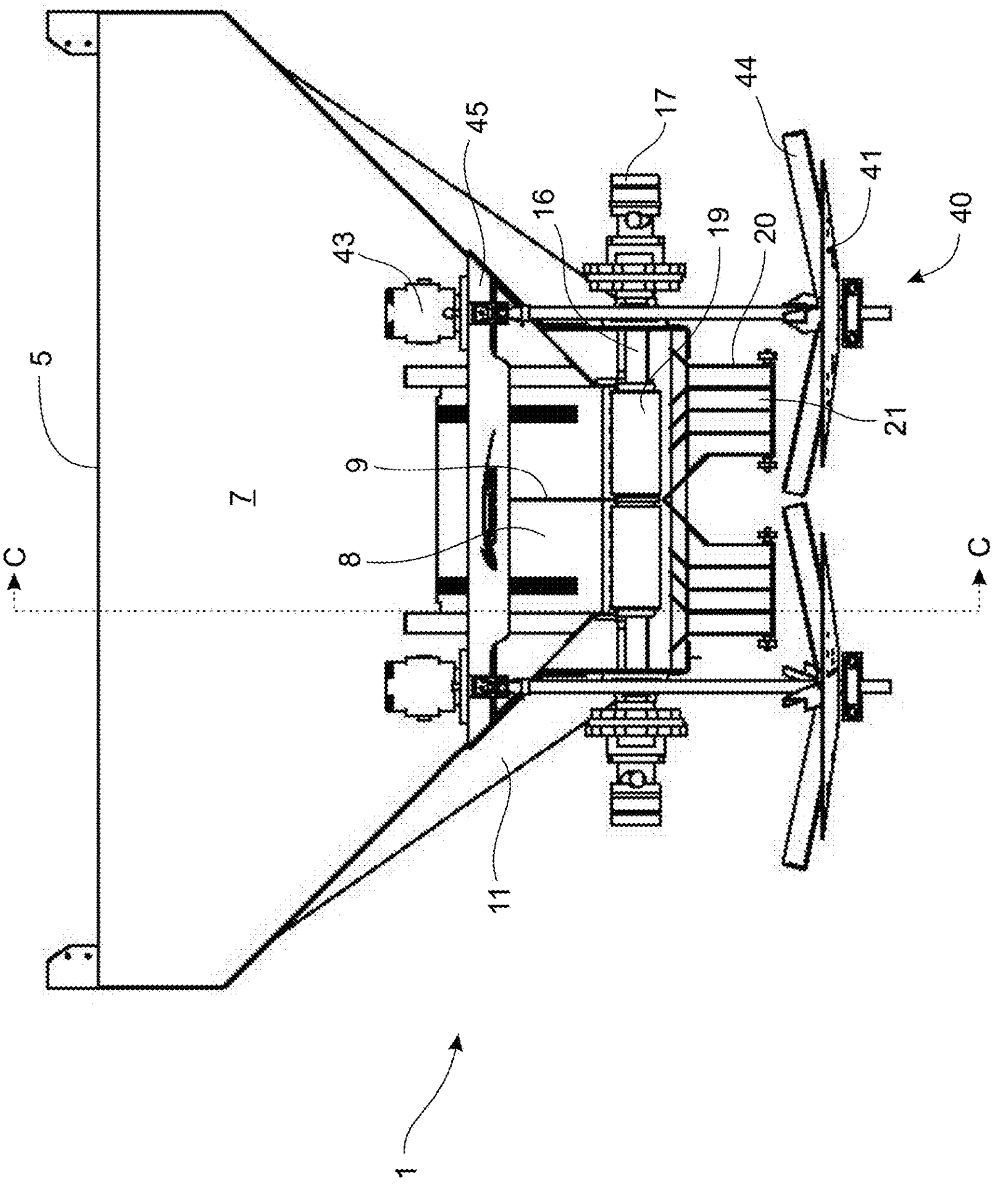
FIG. 3 depicts a rear view of a spinner spreader of FIG. 1.
Figure 4:
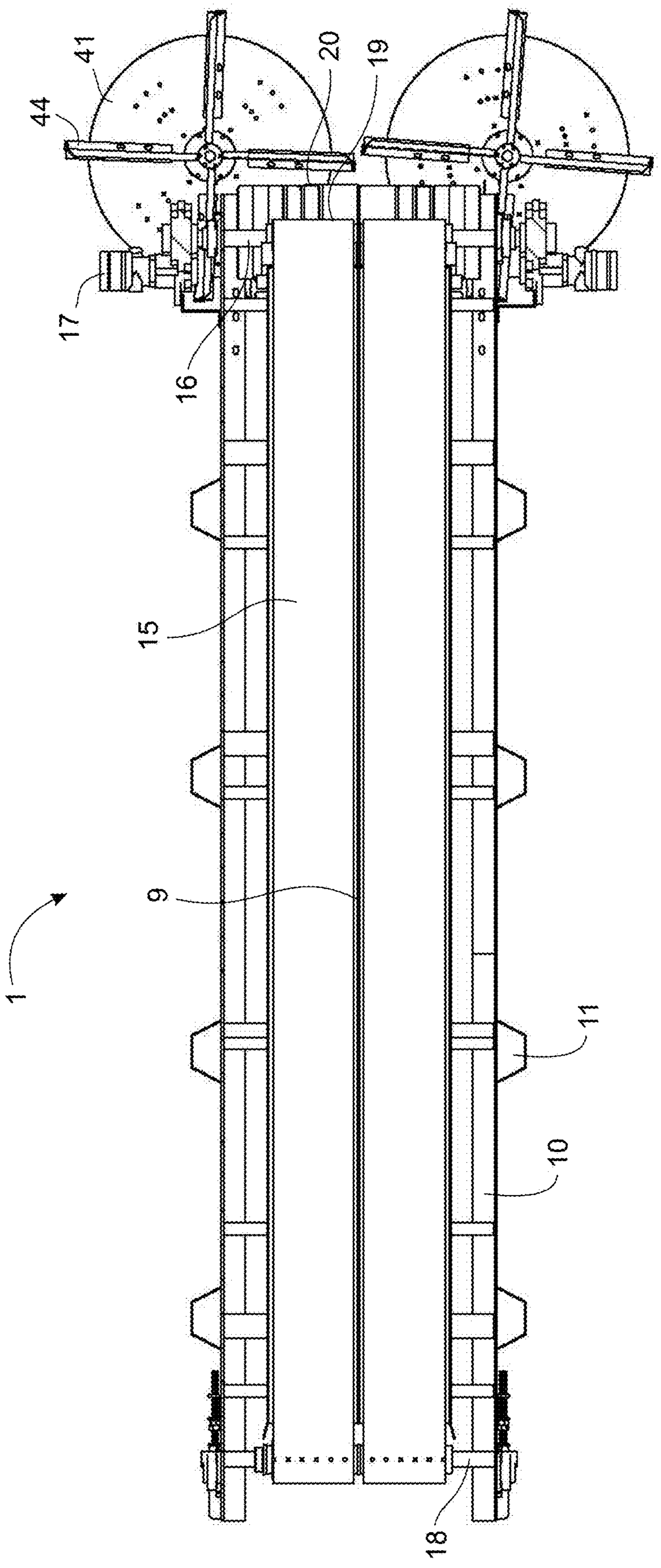
FIG. 4 depicts a cross-sectional view through A-A in FIG. 2.

Referring to FIG. 1 to FIG. 8, one embodiment of a spinner spreader 1 comprises a hopper 5 mounted on a frame 10, the frame 10 comprising a plurality of support rails 11 (only one labeled) for supporting the hopper 5 on the frame 10. The frame 10 is mounted on a vehicle (not shown), for example a truck, a trailer and the like. The hopper 5 is designed to contain particulate material (e.g. fertilizer, fertilizer supplements, seed, sand, gravel, road salt, lime and the like) to be spread on a ground surface as the vehicle drives or is driven on or adjacent the ground surface.

The spinner spreader 1 further comprises a pair of adjacent conveyor belts 15 (only one labeled) situated at a bottom of the hopper 5 and oriented longitudinally with respect to direction of motion of the vehicle. The conveyor belts 15 transport the particulate material in the hopper 5 toward a rear of the hopper 5, and therefore toward a rear of the spinner spreader 1. The conveyor belts 15 comprise endless belts rotationally mounted on transversely oriented drive rollers 16 (only one labeled) located proximate the rear of the spinner spreader 1, and on transversely oriented idler rollers 18 (only one labeled) located proximate a front of the spinner spreader 1. The rollers 16, 18 are rotatably mounted on the frame 10. There are separate drive and idler rollers 16, 18 for each conveyor belt 15 so that the conveyor belts may be driven independently, permitting driving the conveyor belts at different speeds, or even stopping one conveyor belt entirely, if desired. The two drive rollers 16 may be physically separated, or form a nested arrangement in which one of the drive rollers is hollow and a portion of the other of the drive rollers is mounted inside the hollow drive roller on bearings, permitting the two drive rollers to be operated independently. The same kind of nested arrangement may be utilized with the idler rollers 18. The drive rollers 16 are driven by hydraulic motors 17 (only one labeled) mounted on the frame 10. The conveyor belts 15 extend rearwardly pasta rear wall 7 of the hopper 5 transporting the particulate material out of the hopper 5 through a hopper outlet 8 into a transition box 12. A flow divider 9 situated between the two conveyor belts 15 in the hopper 5 and the transition box 12 keeps the particulate material separated into two flow paths.

Two sets 20 (only one labeled) of individually translatable sluices 21 (only one in each set labeled) are disposed below rear ends 19 of the conveyor belts 15 to receive the particulate material flowing off the rear ends 19 of the conveyor belts 15. One set 20 of sluices 21 is associated with one of the conveyor belts 15 and receives the particulate material from the one conveyor belt 15. The other set of sluices receives the particulate material from the other conveyor belt, thereby keeping the flow paths of particulate material separate. Each of the sets 20 is shown with four individual sluices 21, although the sets may comprise more or fewer sluices and/or each of the sets need not have the same number of sluices. In some embodiments, each set may have one, two, three, four, five, six or more sluices.

Figure 5:
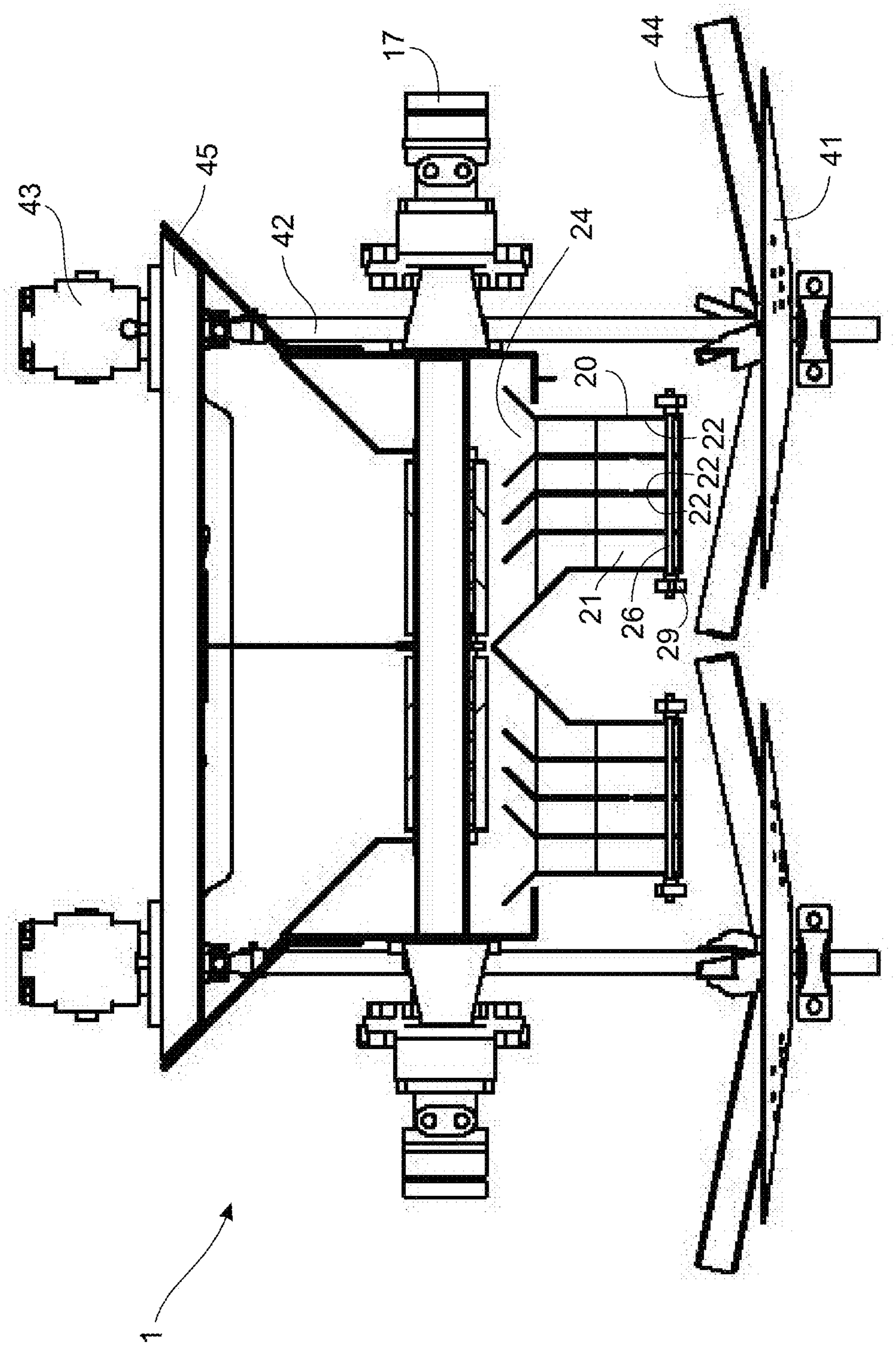
FIG. 5 depicts a cross-sectional view through B-B in FIG. 2.
Figure 6:
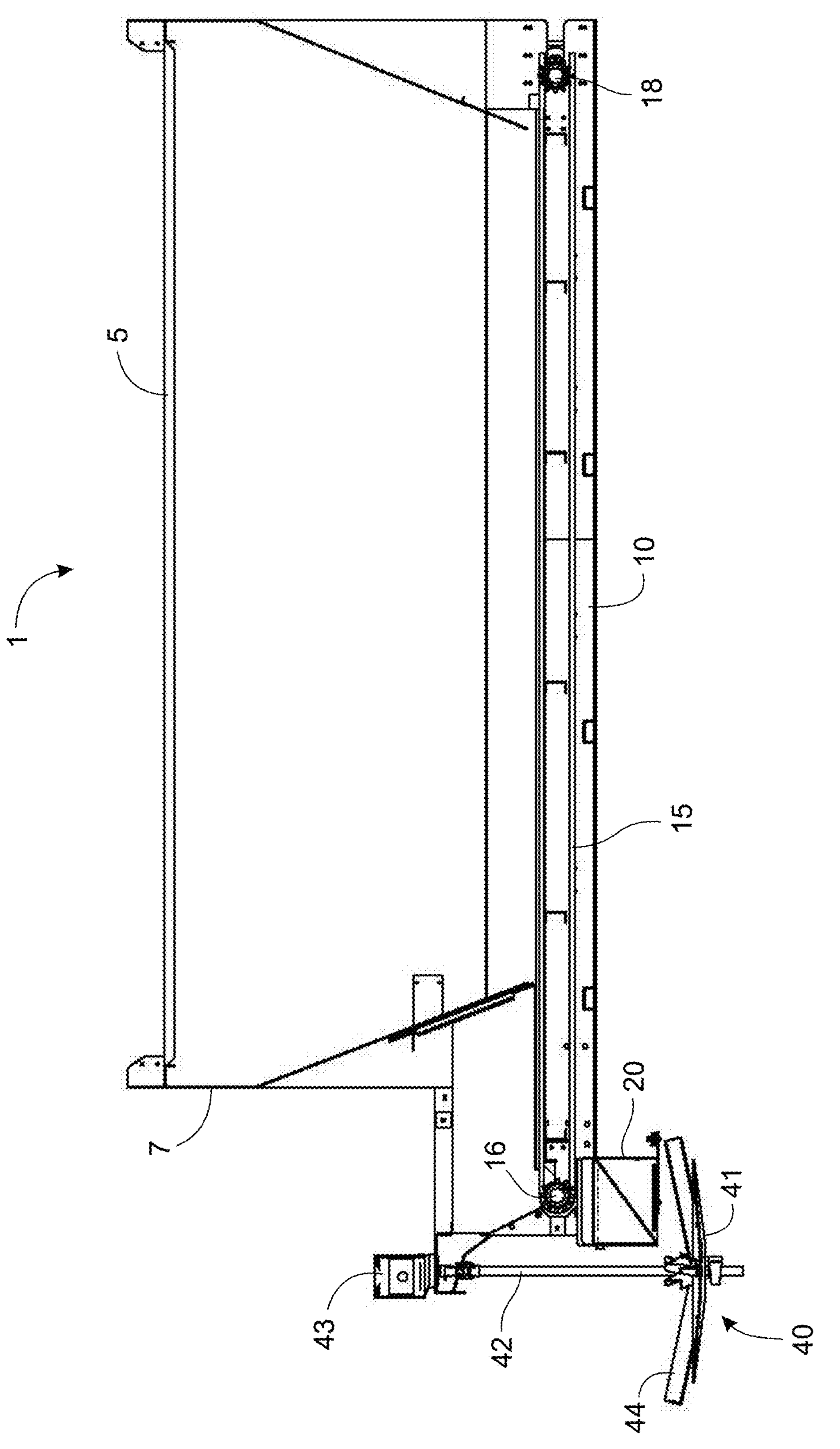
FIG. 6 depicts a cross-sectional view through C-C in FIG. 3.
Figure 7:
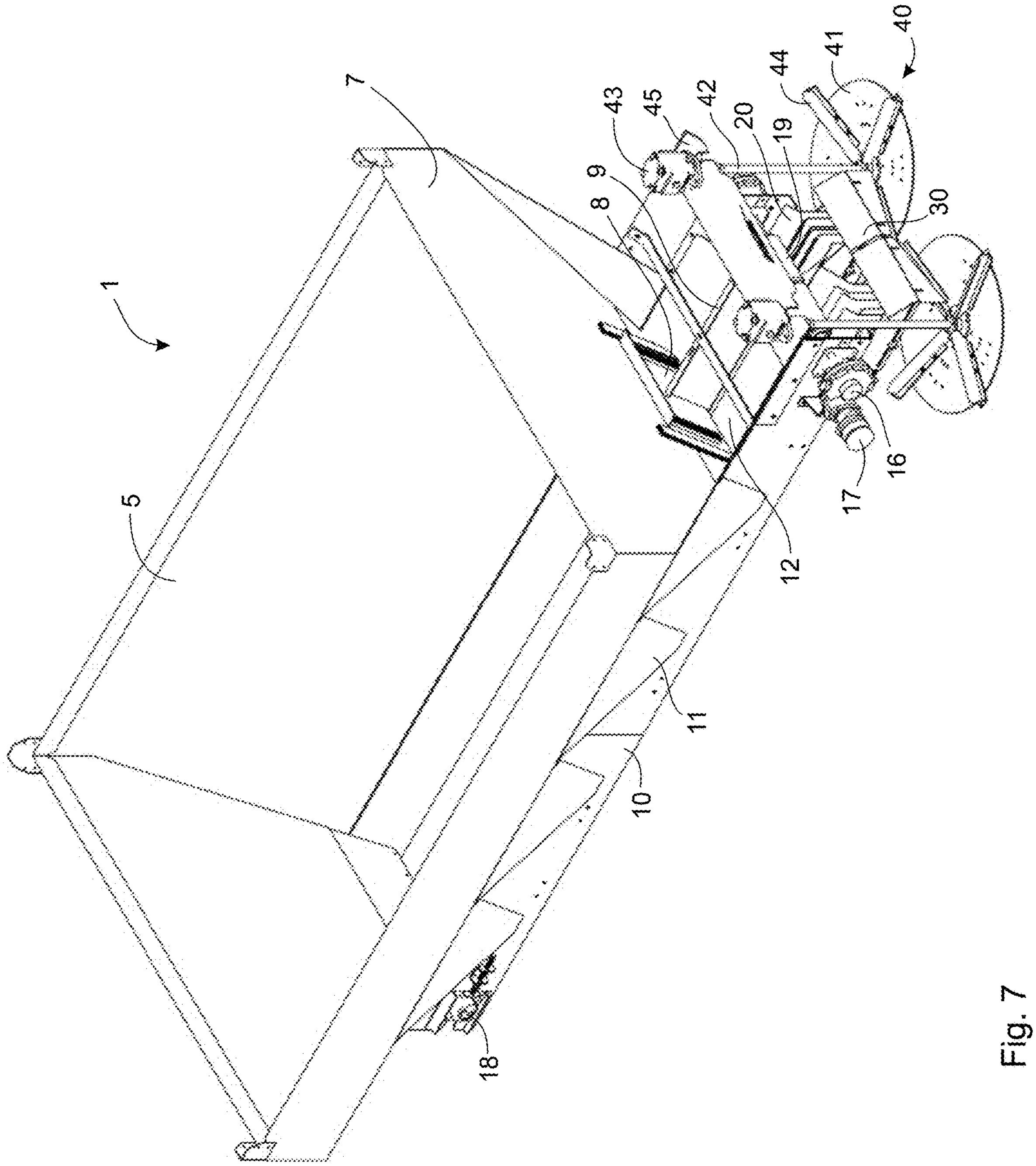
FIG. 7 depicts the spinner spreader of FIG. 1 including deflection plates over spinner discs.
Figure 8:
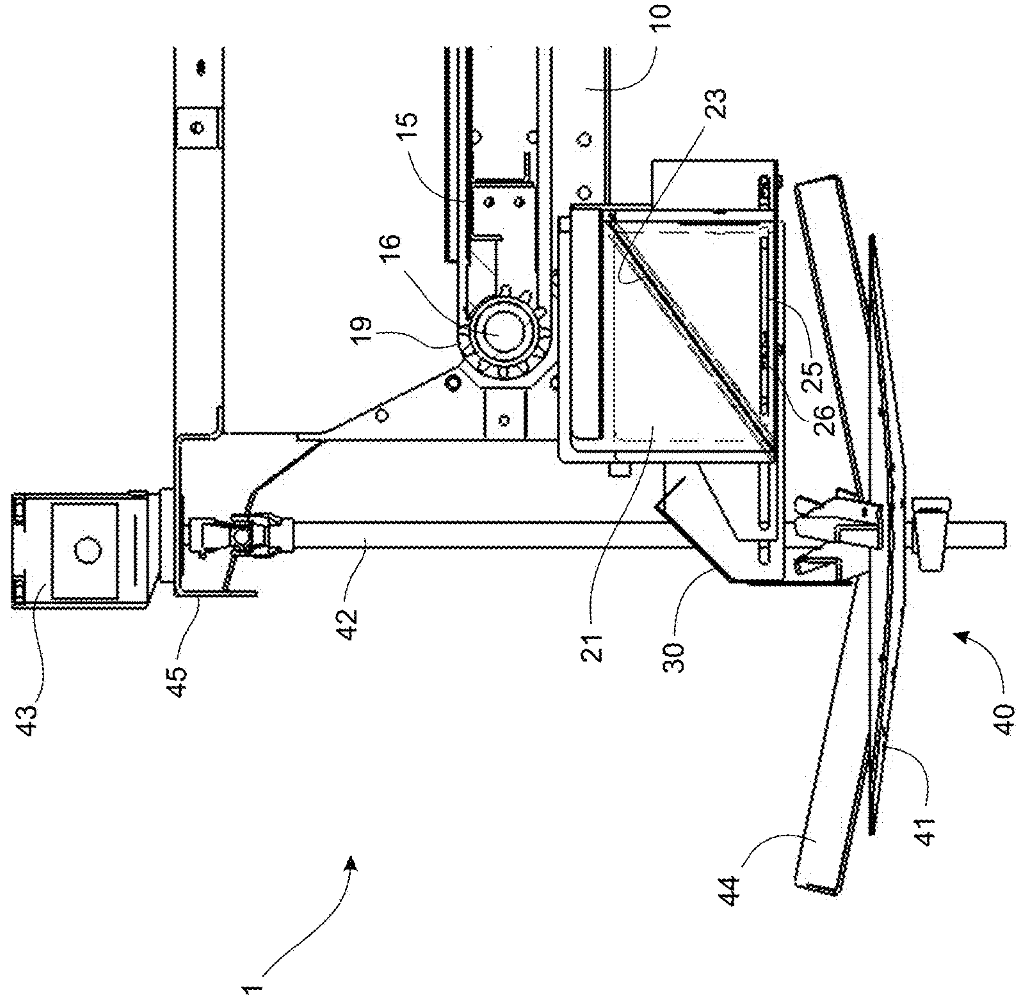
FIG. 8 depicts a magnified side view of a rear end of the spinner spreader of FIG. 7.

With specific reference to FIG. 5 and FIG. 8, each of the sluices 21 comprise substantially vertically oriented side walls 22. The sluices 21 have open tops, but are closed at a bottom and front thereof by an inclined floor 23. The floor 23 is inclined downwardly from front to rear so that the particulate material may flow freely out of open rear ends of the sluices 21. The open tops may comprise funnels 24 to guide particulate material from the conveyor belts 15 into the sluices 21 so that each sluice 21 receives a portion of the particulate material, each portion being substantially the same amount. The funnels atop the end sluices in each set of sluices may be flared outwardly from the sets of sluices to ensure that all of, or at least most of, the particulate material falling off the conveyor belts 15 enters the sluices 21.

With specific reference to FIG. 8, the sluices 21 are disposed transversely to one another to form a series of parallel channels. Each of the side walls 22 of each of the sluices 21 comprise a longitudinally oriented elongated slot 25 situated in the side wall 22 below the floor 23. All of the slots 25 in a given set of sluices are parallel to each other and transversely aligned so that a threaded rod 26 maybe inserted transversely through all of the slots 25 in the sluices of the given set thereby supporting all of the sluices in the given set on the rod 26. Loosening one or more nuts, for example one or both of nuts 29 (see FIG. 5, only one labeled) on the threaded rod permits the sluices 21 to translate longitudinally forward and backward on the rod 26 by virtue of the elongated slot 25. Once the sluices 21 have been moved to desired longitudinal positions, the nuts 29 may be tightened on the rod 26 to immobilize all of the sluices 21 in new longitudinal positions. Because each of the sluices 21 supported on the rod 26 are individual structures, the sluices 21 may be longitudinally positioned independently of each other.

The spinner spreader 1 further comprises deflection plates 30 (only one labeled) mounted on the frame 10 to a rear of the sets 20 of sluices 21. The deflection plates 30 downwardly deflects the particulate material exiting from the open rear ends of the sluices 21.

The spinner spreader 1 further comprises a pair of adjacent spinner assemblies 40 (only one labeled) mounted on the frame 10 at the rear of the spinner spreader 1 behind the hopper 5 and below the sluices 21. If desired, the spinner assemblies may be mounted on a side of or in front of the hopper, with the sluices and conveyor belts positioned accordingly, but mounting the spinner assemblies behind the hopper is more typical in the art. Each spinner assembly 40 comprises a spinner disc 41 having a slightly concave upper surface that receives the particulate material from one set 20 of the sluices 21. Each spinner assembly 40 comprises a substantially vertically oriented spinner drive shaft 42 attached to a center of the spinner disc 41 and to a spinner drive motor 43. The spinner drive motor 43 is mounted on a spinner motor mount 45 mounted on the frame 10. Operation of the spinner drive motor 43 causes the spinner disc 41 to rotate in a plane parallel to the ground surface. Particulate material from the sluices 21 landing on the spinner disc 41 is propelled horizontally off the spinner disc 41 under the influence of centripetal force to be broadcast outwardly from the spinner spreader 1. The upper surface of the spinner disc 41 further comprises radially oriented fins 44, which assist with propelling the particulate material off the disc 41. The fins 44 may be designed to enhance throw distance and uniformity of spread pattern of the particulate material. While four fins 44 per spinner disc 41 are illustrated, each spinner disc 41 may comprise fewer or more fins, for example, each spinner disc 41 may comprise one, two, three, four, five, six or more fins.

The particulate material transported by one of the conveyor belts 15 through one set 20 of the sluices 21 is delivered to one of the spinner discs 41, while the other spinner disc of the pair receives the particulate material transported by the other of the conveyor belts through the other set of sluices. Because the longitudinal position of the spinner discs 41 is fixed, longitudinal translation of an individual sluice 21 results in the portion of particulate material from the individual sluice 21 to fall on the corresponding spinner disc 41 at a different radial position on the disc 41. Thus, swath control of the particulate material broadcast from each spinner disc 41 can be controlled independently for each disc 41 by independently controlling speed of the conveyor belts 15, longitudinal position of each sluice 21 in each set 20 of sluices 21, and rotational speed of each disc 41.

While a pair of conveyor belts, two sets of sluices and a pair of spinner assemblies are illustrated in the embodiment shown in the Figures, it is understood that the spinner spreader may comprise one or more conveyor belt, one or more set of sluices and/or one or more spinner assembly, where one or more may be, for example, one, two, three, four or more.

Referring to FIG. 9 to FIG. 12, the spinner spreader 1 provides improved control over spread pattern of the particulate material being broadcast by the spreader 1.

Figure 9:
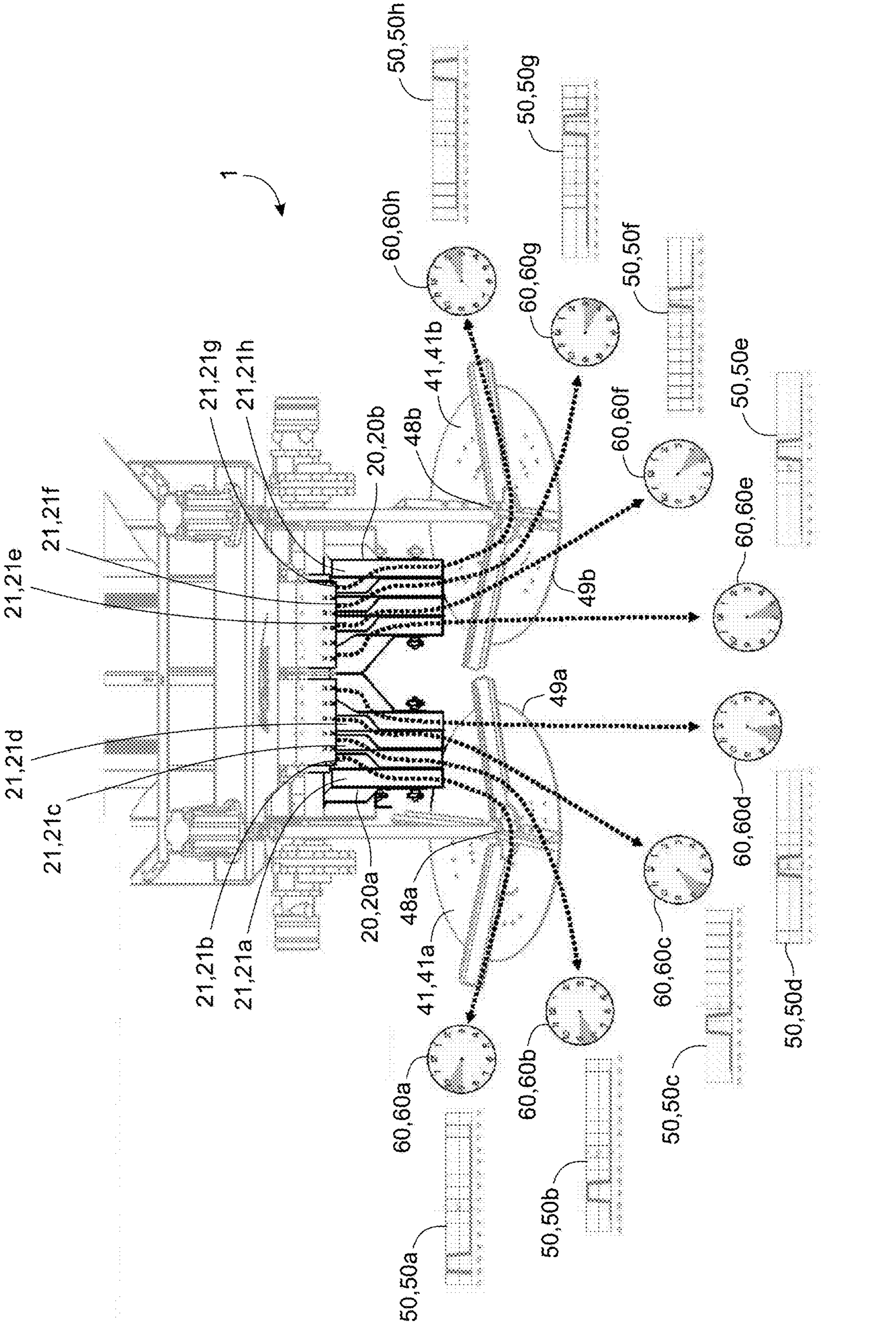
FIG. 9 depicts a division of particulate material spread pattern produced by the spinner spreader of FIG. 7 with all sluices at the same longitudinal position.
Figure 10A:
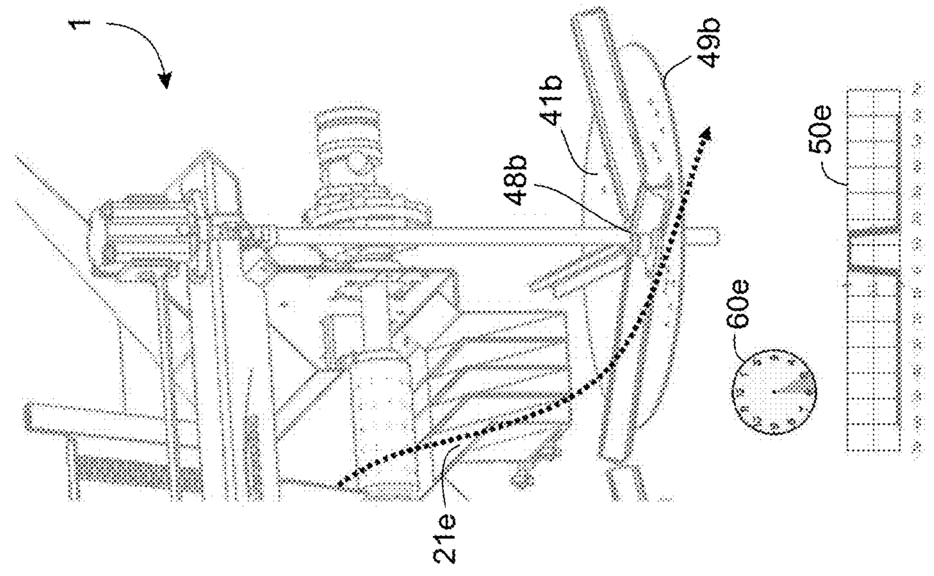
FIG. 10A, FIG. 10B and FIG. 10C illustrate how particle spread pattern is affected by increasing (FIG. 10B) and decreasing (FIG. 10C) rotational speed of the spinner discs of the spinner spreader of FIG. 7.
Figure 10B:
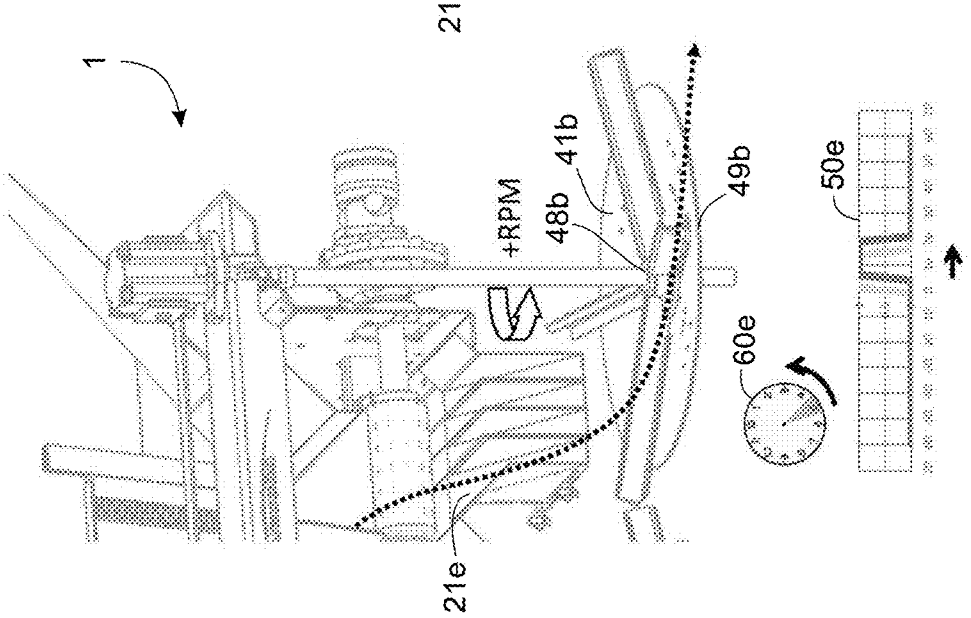
Figure 10C:
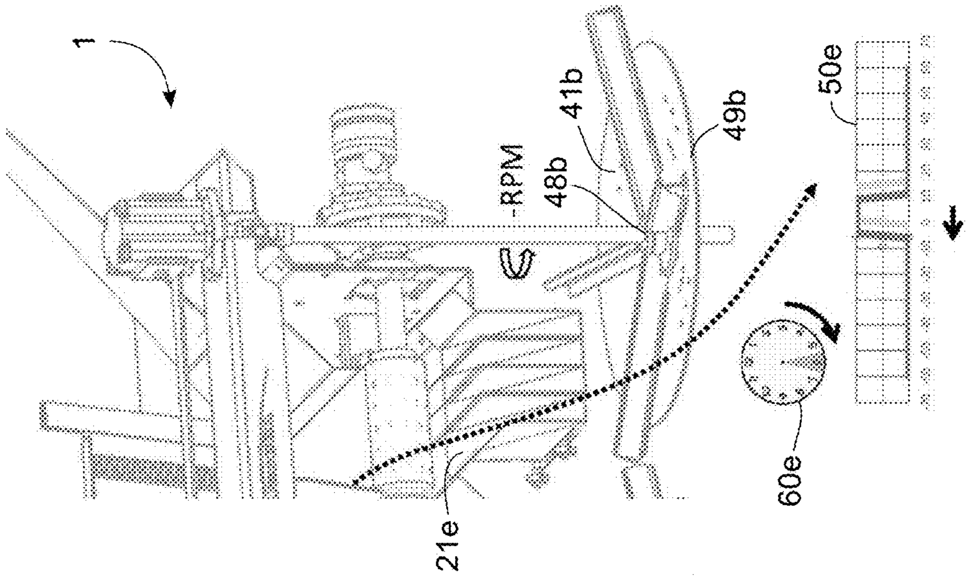

FIG. 9 illustrates a division of particulate material spread pattern 50 (individually labeled as 50*a*, 50*b*, 50*c*, 50*d*, 50*e*, 50*f*, 50*g*, 50*h* for the particle spread pattern from each sluice) and particle trajectories 60 (individually labeled as 60*a*, 60*b*, 60*c*, 60*d*, 60*e*, 60*f*, 60*g*, 60*h* for the trajectory from each sluice) produced by the spinner spreader 1 when all of the sluices 21 (individually labeled as 21*a*, 21*b*, 21*c*, 21*d*, 21*e*, 21*f*, 21*g*, 21*h*) are at the same longitudinal position. The sluices 21 are in two sets 20 of sluices, the sets 20 individually labeled as left set 20*a* and right set 20*b*. The sluices 21*a*, 21*b*, 21*c*, 21*d* are in the left set 20*a*, while the sluices 21*d*, 21*e*, 21*f*, 21*g*, 21*h* are in the right set 20*b*. The individual particle spread patterns 50*a*, 50*b*, 50*c*, 50*d*, 50*e*, 50*f*, 50*g*, 50*h* correspond to the individual trajectories 60*a*, 60*b*, 60*c*, 60*d*, 60*e*, 60*f*, 60*g*, 60*h*, respectively, which correspond to the individual sluices 21*a*, 21*b*, 21*c*, 21*d*, 21*e*, 21*f*, 21*g*, 21*h*, respectively. Particle flow paths from each sluice 21*a*, 21*b*, 21*c*, 21*d*, 21*e*, 21*f*, 21*g*, 21*h* are illustrated in dashed lines.

Still referring to FIG. 9, particulate material flowing out of the sluices 21 is delivered to the spinner discs 41 (individually labeled as left disc 41*a* and right disc 41*b*) to be broadcast to the ground following the illustrated trajectories 60. The left disc 41*a* broadcasts particulate material delivered by the left set 20*a* of sluices and the right disc 41*b* broadcasts particulate material delivered by the right set 20*b* of sluices. The particulate material delivered from one of the sluices in one set of sluices is dropped on the associated spinner disc at a different radial distance from a center of the spinner disc than the particulate material delivered from the other of the sluices in that set. For example, the particulate material from the outermost sluice 21*a* in the left set 20*a* is dropped on the left disc 41*a* proximate a center 48*a* of the left disc 41*a*. In comparison, the particulate material from the innermost sluice 21*d* in the left set 20*a* is dropped on the left disc 41*a* proximate a periphery 49*a* of the left disc 41*a*. Consequently, the particulate material from the outermost sluice 21*a* spends more time on the left disc 41*a* and has a more rearward trajectory 60*a* compared to the particulate material from the innermost sluice 21*d* when the respective particulate materials are finally broadcast by the spinning left disc 41*a*. The two middle sluices 21*b*, 21*c* deliver particulate material at different radial positions on the left disc 41*a*, which are intermediate between the more central position of the particulate material from the outermost sluice 21*a* and the more peripheral position of the particulate material from the innermost sluice 21*d*. An equivalent arrangement applies to the right disc 41*b* having a center 48*b* and a periphery 49*b*, and servicing the right set 20*b*.

As can be seen in FIG. 9, the arrangements of sluices 21 and spinner discs 41 described above can provide a uniform spread pattern 50 of particulate material through an angle of about 240° behind the spreader 1.

The trajectory and spread pattern of particulate material delivered from an individual sluice is affected by the rotational speed of the spinner discs. Thus, the integrity of the spread pattern illustrated in FIG. 9 would be disrupted if an operator wants to alter the rotational speed of one or more of the spinner discs. For example, with reference to FIG. 10A, FIG. 10B and FIG. 10C, increasing the rotational speed of the right disc 41*b* (FIG. 10B) in comparison to a 'normal' rotational speed (FIG. 10A) causes the particulate material delivered to the right disc 41*b* from the sluice 21*e* to be broadcast from the right disc 41*b* at a position transversely rightward from the position the particulate material is delivered at the 'normal' rotational speed of the right disc 41*b*. Thus, the trajectory 60*e* and the spread pattern 50*e* of the particulate material delivered by the sluice 21*e* are skewed to the right when the rotational speed of the right disc 41*b* is increased (compare FIG. 10A to FIG. 10B). Conversely, decreasing the rotational speed of the right disc 41*b* (FIG. 10C) in comparison to a 'normal' rotational speed (FIG. 10A) causes the particulate material delivered to the right disc 41*b* from the sluice 21*e* to be broadcast from the right disc 41*b* at a position transversely leftward from the position the particulate material is delivered at the 'normal' rotational speed of the right disc 41*b*. Thus, the trajectory 60*e* and the spread pattern 50*e* of the particulate material delivered by the sluice 21*e* are skewed to the left when the rotational speed of the right disc 41*b* is decreased (compare FIG. 10A to FIG. 10C).

Figure 11C:
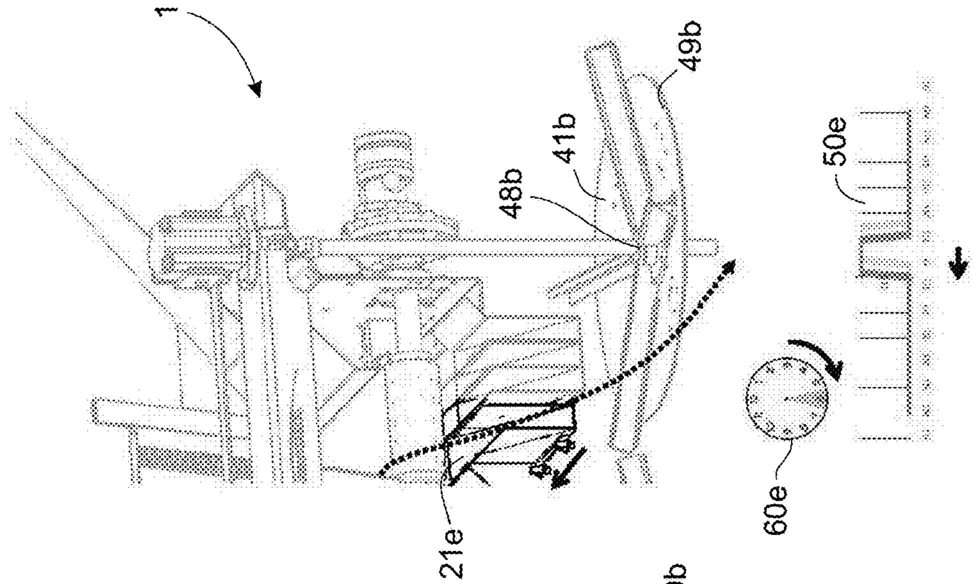
FIG. 11A, FIG. 11B and FIG. 11C illustrate how particle spread pattern is affected by forwardly (FIG. 11B) and rearwardly (FIG. 11C) moving a sluice of the spinner spreader of FIG. 7; and, FIG. 12 illustrates how moving sluices and adjusting rotational speed of spinner discs can be used to manipulate particle spread pattern to switch off one of eight broadcast sections of the spinner spreader of FIG. 7.
Figure 11B:
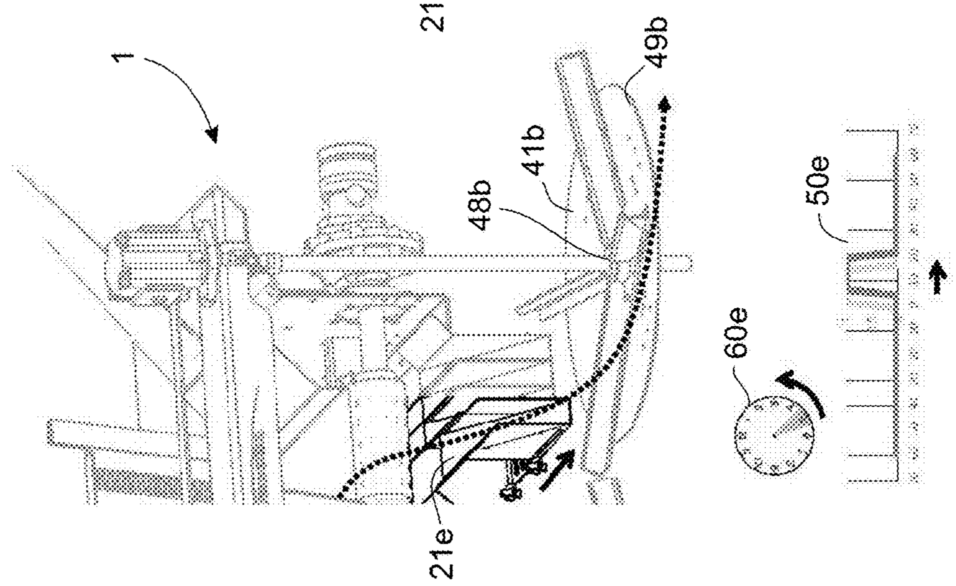
Figure 11A:
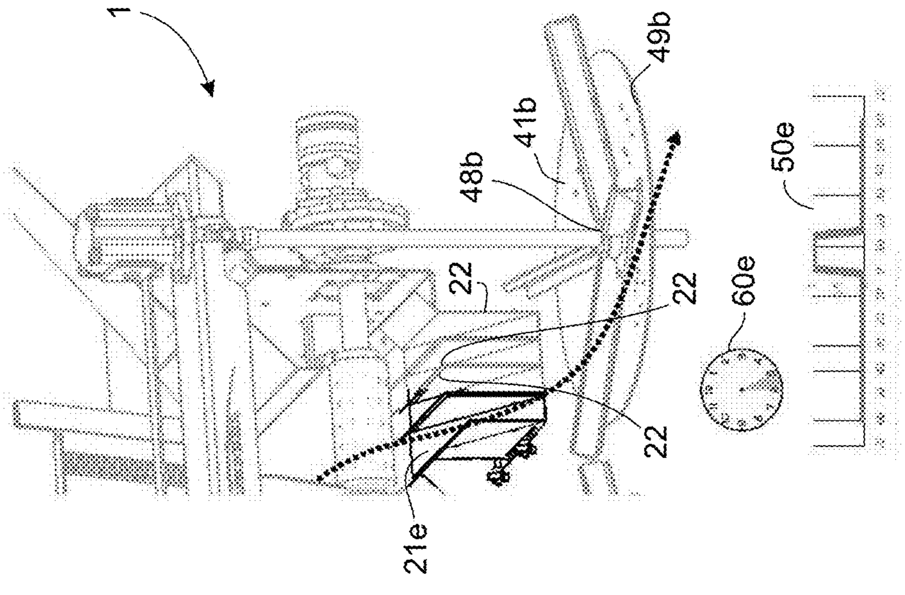

The trajectory and spread pattern of particulate material delivered from an individual sluice may be altered by adjusting position of the individual sluice forward or rearward (i.e. longitudinally) with respect to the other sluices. Independent adjustment of the longitudinal position of an individual sluice adjusts the radial position at which the particulate material from the individual sluice is dropped on the spinner disc, because longitudinal position of the spinner disc remains fixed. The ability to independently adjust the longitudinal position of each sluice permits compensating for changes in the rotational speed of one or more of the spinner discs to maintain spread pattern integrity. For example, with reference to FIG. 11A, FIG. 11B and FIG. 11C, rearwardly translating the sluice 21*e* (FIG. 11B) with respect to the other sluices causes the particulate material to drop on the right disc 41*b* radially closer to the center 48*b* than when the sluice 21*e* is in a 'normal' longitudinal position (FIG. 11A). The particulate material therefore resides for a longer period of time on the spinning right disc 41*b* before being broadcast, resulting in the particulate material being broadcast in a particle trajectory 60*e* that is skewed to the right (compare FIG. 11A to FIG. 11B). As a result, the spread pattern 50*e* of the particulate material from the sluice 21*e* is also skewed to the right (compare FIG. 11A to FIG. 11B). Conversely, forwardly translating the sluice 21*e* (FIG. 11C) with respect to the other sluices causes the particulate material to drop on the right disc 41*b* radially closer to the periphery 49*b* than when the sluice 21*e* is in a 'normal' longitudinal position (FIG. 11A). The particulate material therefore resides for a shorter period of time on the spinning right disc 41*b* before being broadcast, resulting in the particulate material being broadcast in a particle trajectory 60*e* that is skewed to the left (compare FIG. 11A to FIG. 11C). As a result, the spread pattern 50*e* of the particulate material from the sluice 21*e* is also skewed to the left (compare FIG. 10A to FIG. 11C). Particle flow path from the sluice 21*e* is illustrated with a dashed line in FIG. 11A, FIG. 11B and FIG. 11C. FIG. 11A, FIG. 11B and FIG. 11C illustrate that trajectory and spread pattern of the particulate material delivered from any particular sluice can be skewed left or right by altering the longitudinal position of the particular sluice.

Figure 12:
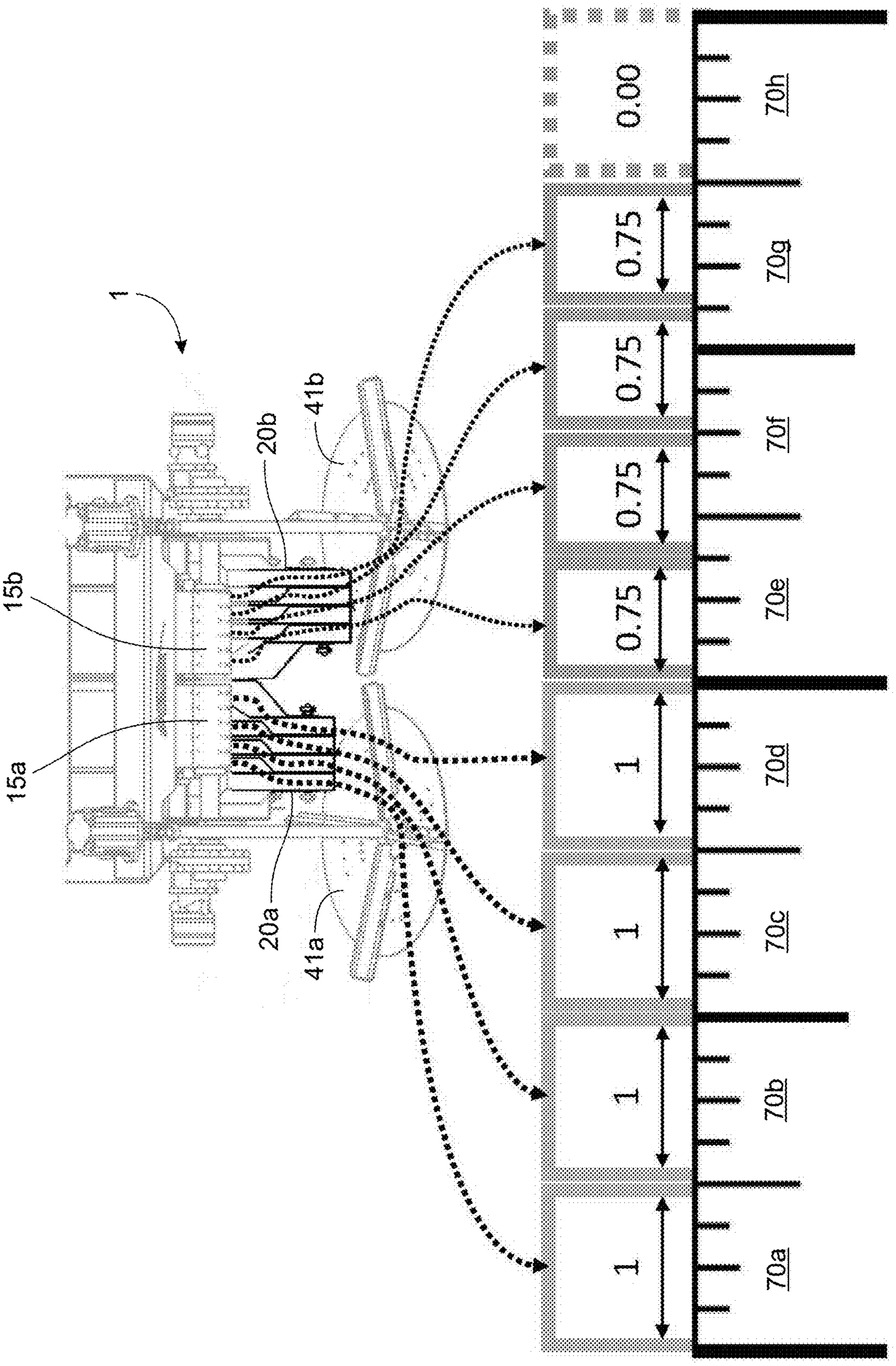

Deliberate control of the longitudinal position of one or more of the sluices, the rotational speed of one or more of the spinner discs and the speed of one or more of the conveyor belts can be used to develop custom spread patterns for the particulate material. The rotational speed of the spinner discs controls rotational positions at which the particulate material is broadcasted from the spinner discs. The speed of the conveyor belts controls rates at which the particulate material is delivered to the spinner discs. FIG. 12 illustrates one possibility in which particle spread pattern is manipulated to switch off one of eight broadcast sections while maintaining a uniform spread pattern in the other seven broadcast sections. With reference to FIG. 12, the left set 20*a* of sluices and the right set 20*b* of sluices receive particulate material from a left conveyor belt 15*a* and a right conveyor belt 15*b*, respectively. The left set 20*a* of sluices and the right set 20*b* of sluices deliver the particulate material to the left disc 41*a* and the right disc 41*b*, respectively. The particulate material is normally broadcast into broadcast sections. The broadcast sections comprise four left-side sections 70*a*, 70*b*, 70*c*, 70*d* on a left side of the spreader 1, the four left-side sections 70*a*, 70*b*, 70*c*, 70*d* each correlating to the four sluices 21*a*, 21*b*, 21*c*, 21*d* (see FIG. 9), respectively, of the left set 20*a* of sluices. Likewise, the broadcast sections comprise four right-side sections 70*e*, 70*f*, 70*g*, 70*h* on a right side of the spreader 1, the four right-side sections 70*e*, 70*f*, 70*g*, 70*h* each correlating to the four sluices 21*e*, 21*f*, 21*g*, 21*h* (see FIG. 9), respectively, of the right set 20*b* of sluices. However, it may be desirable in some applications to switch off broadcasting the particulate material to section 70*h* while maintaining a uniform spread pattern across the other seven sections 70*a*, 70*b*, 70*c*, 70*d*, 70*e*, 70*f*, 70*g*. To accomplish such a custom spread pattern, the left conveyor belt 15*a* and the left disc 41*a* may be operated at normal speeds with the left set 20*a* of sluices in the normal longitudinal positions, thereby delivering 1 unit of particulate material to each of the four left-side sections 70*a*, 70*b*, 70*c*, 70*d*. On the right side, the right conveyor belt 15*b* may be operated at three-quarters of the normal speed, the right disc 41*b* may be operated at lower rotational speed and the right set 20*b* of sluices may be translated rearwardly. The lower rotational speed of the right disc 41*b* and the rearward translation of the right set 20*b* of sluices are balanced so that section 70*h* receives no particulate material, and the other three right-side sections 70*e*, 70*f*, 70*g* each receive the same amount of particulate material as each of the left-side sections (i.e. 1 unit), but each of the three right-side sections 70*e*, 70*f*, 70*g* receive particulate from two of the sluices of the right set 20*b* of sluices. Particle flow paths from each sluice are illustrated in dashed lines. Thus, section 70*e* receives 0.75 unit of particulate material from the sluice 21*e* and 0.25 unit of particulate material from the sluice 21*f*; section 70*f* receives 0.5 unit of particulate material from the sluice 21*f* and 0.5 unit of particulate material from the sluice 21*g*; section 70*g* receives 0.25 unit of particulate material from the sluice 21*g* and 0.75 unit of particulate material from the sluice 21*h*; and, section 70*h* receives no particulate material. Each of the sluices 21*e*, 21*f*,

21g, 21h of the right set 20b of sluices delivers a total of 0.75 unit because the right conveyor belt 15b is operated at three-quarters of the normal speed. However, the particulate material delivered by each of the four sluices 21e, 21f, 21g, 21h is divided between the three right-side sections 70e, 70f, 70g as a result of balancing the lower rotational speed of the right disc 41b with the rearward longitudinal translation of the right set 20b of sluices. Because the longitudinal position of each sluice is independently adjustable, it is possible to create many different spread patterns for a variety of different applications and situations by balancing longitudinal sluice positions, rotational speeds of the spinner discs and operating speeds of the conveyor belts.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A method of controlling spread pattern of a particulate material broadcasted by a spinner spreader, the method comprising:

permitting the particulate material to flow through a plurality of sluices situated in a particulate material path between a bin and a rotatable disc of the spinner spreader, each sluice of the plurality of sluices receiving a portion of the particulate material and delivering the portion of the particulate material to a radial and/or angular position on the rotatable disc; and adjusting the radial and/or angular position on the rotatable disc to which the portion of the particulate material from at least one independently moveable sluice of the plurality of sluices is delivered by longitudinally translating the at least one independently moveable sluice of the plurality of sluices, independent of all other sluices of the plurality of sluices, to change position of the at least one independently moveable sluice relative to the rotating disc thereby changing the spread pattern of the particulate material broadcasted by the rotatable disc.

2. The method of claim 1, wherein each sluice of the plurality of sluices is an individual structure comprising side walls, an open first end for receiving the particulate material from a conveyor, and an inclined floor inclined downwardly from the open first end to an open second end of the sluice so that the particulate material in the sluice flows freely out the open second end.

3. The method of claim 1, wherein each of the sluices in the plurality of sluices is independently moveable.

4. The method of claim 1, wherein rate at which the particulate material is delivered to the rotatable disc is controlled to further change the spread pattern of the particulate material.

5. The method of claim 1, wherein rotational speed of the rotatable disc is controlled to further change the spread pattern of the particulate material.

6. The method of claim 2, wherein the floor is inclined downwardly from front to rear.

7. The method of claim 1, wherein the rotatable disc comprises first and second rotatable discs, and the plurality of sluices comprises first and second sets of sluices, the first set of sluices delivering the particulate material to the first rotatable disc and the second set of sluices delivering the particulate material to the second rotatable disc.

8. The method of claim 1, wherein the plurality of sluices comprises at least four sluices.

9. The method of claim 2, wherein the open first end is at a top of the sluice.

10. The method of claim 2, wherein the side walls of each sluice are not common with any of the other sluices.

* * * * *